(12) United States Patent
Lee et al.

(10) Patent No.: US 9,845,543 B2
(45) Date of Patent: Dec. 19, 2017

(54) METHOD OF DUPLICATING NANO PATTERN TEXTURE ON OBJECT'S SURFACE BY NANO IMPRINTING AND ELECTROFORMING

(71) Applicant: EMOT CO., LTD., Ansan-si (KR)

(72) Inventors: Kyung Wook Lee, Ansan-si (KR); Kyung Yul Lee, Bucheon-si (KR); Jun Sang Jeong, Daejeon-si (KR)

(*) Notice: Subject to any disclaimer, the term of this patent is extended or adjusted under 35 U.S.C. 154(b) by 444 days.

(21) Appl. No.: 14/582,678

(22) Filed: Dec. 24, 2014

(65) Prior Publication Data

US 2015/0108000 A1    Apr. 23, 2015

Related U.S. Application Data

(63) Continuation-in-part of application No. 12/655,030, filed on Dec. 22, 2009, now abandoned, which is a
(Continued)

(30) Foreign Application Priority Data

Jun. 28, 2007   (KR) .................. 10-2007-0064153

(51) Int. Cl.
  *C25D 1/10*   (2006.01)
  *B23P 15/24*  (2006.01)
  (Continued)

(52) U.S. Cl.
  CPC ............... *C25D 1/10* (2013.01); *B23P 15/24* (2013.01); *B29C 33/3857* (2013.01); *C23C 18/1657* (2013.01); *C25D 1/006* (2013.01)

(58) Field of Classification Search
  CPC ............. C25D 1/10; B29C 33/3857–33/3885
  See application file for complete search history.

(56) References Cited

U.S. PATENT DOCUMENTS

2004/0134786 A1   7/2004  Chiang et al.
2004/0219246 A1   11/2004 Jeans
(Continued)

FOREIGN PATENT DOCUMENTS

DE       3443228        2/1986
KR   10-2004-0051989    6/2004
KR      10-0614039      8/2006

OTHER PUBLICATIONS

English translation of 10-2004-0051989.
(Continued)

*Primary Examiner* — Bryan D. Ripa
*Assistant Examiner* — Ho-Sung Chung
(74) *Attorney, Agent, or Firm* — Antonio Ha & U.S. Patent, LLC

(57) ABSTRACT

According to an embodiment of the present invention, a method for producing a duplicate of a nano-pattern texture of a surface of an object through electroforming using an imprint mold comprises selecting the object having the nano-pattern texture, disposing the selected object and pre-treating a surface of the object by washing, drying and then forming a nano-thin film thereto to block transfer of impurities, metallizing a surface of the plastic mold through, e.g., vapor deposition, spraying, and wet silver mirror reaction, and performing a first electroforming of the surface of the plastic mold, and repeating to thus manufacture a plurality of metal module master molds.

11 Claims, 13 Drawing Sheets

Related U.S. Application Data continuation of application No. PCT/KR2007/003161, filed on Jun. 28, 2007.

(51) Int. Cl.
  *B29C 33/38* (2006.01)
  *C23C 18/16* (2006.01)
  *C25D 1/00* (2006.01)

(56) References Cited

U.S. PATENT DOCUMENTS

| | | |
|---|---|---|
| 2006/0057847 A1 | 5/2006 | Yanagawa et al. |
| 2006/0110125 A1 | 5/2006 | Lin et al. |
| 2006/0131785 A1 | 6/2006 | Sewell |
| 2007/0117389 A1 | 5/2007 | Takaki |
| 2010/0101961 A1* | 4/2010 | Lee .................. B23P 15/24 205/69 |

OTHER PUBLICATIONS

English abstract of 10-0614039.
English abstract of 3443228.
Spray deposition of metals: A review (E.J. Lavernia, N.J. Grant); Paper presented at the Sixth International Conference on Rapidly Quenched Metals, Montréal, Aug. 3-7, 1987.
Thermocurable polymers as resists for imprint lithography: M. Tormen, et al.; Electronics Letters May 25, 2000 vol. 36 No. 11.

\* cited by examiner

METHOD OF DUPLICATING NANO PATTERN TEXTURE ON OBJECT'S SURFACE BY NANO IMPRINTING AND ELECTROFORMING

CROSS-REFERENCE TO RELATED APPLICATIONS

This patent application is a continuation-in-part of U.S. patent application Ser. No. 12/655,030 filed on Dec. 22, 2009, which is a national stage application of International Patent Application Serial No, PCT/KR2007/003161, which claims priority to Korean Patent Application No, 10-2007-0064153, filed on Jun. 28, 2007 in the Korean Intellectual Property Office and issued Patent No, 10-0874492 on Dec. 10, 2008, the disclosures of which are incorporated by reference herein in their entireties.

BACKGROUND OF THE INVENTION

The present invention relates to the nano-duplication of the surface of an object, and more particularly, to a method of duplicating the nano-pattern of the surface of an object, by duplicating the fine and beautiful surface of an object, which is to be duplicated, using nano-imprinting and electroforming, thus realizing an original texture.

Generally, the skins or surfaces of objects naturally present in the natural world, such as plants, insects, leather, minerals, trees, fiber, and fabric, have very beautiful and soft structures and textures and exhibit natural colors, and thus research and development into the application thereof to decorate the outer appearances of mass-produced industrial products is ongoing. In particular, because mobile communication portable terminals, PDAs, or notebook computers, which are expensive and are manufactured to be luxurious, should always be carried, the surface thereof is required to have low abrasion and be easy to maintain, and further, because they are shown to other persons, the outer appearance thereof is required to have a soft and luxurious texture or feel.

It is typical for metal material to be used to decrease the abrasion of a surface and for natural material to be used to impart a soft feel. Therefore, in order to develop an outer appearance or surface imparting a soft feel using metal material having low abrasion, lots of time and money are invested. Meanwhile, duplication methods in plastic are being developed.

The case where an object having a predetermined pattern to be duplicated is soft enables complicated and fine surface duplication but makes it difficult to manufacture a mold for use in such duplication. Further, although an etching process including photolithography and chemical etching may be applied to produce complicated and fine patterns, it is unsuitable for mass production. In the case of plastic dolls, wire telephones, automobiles or the like, a molding technique is applied at high pressure using a press so that the same shape or outer appearance is mass-duplicated, whereas, in the case of the skin of insects, plants, processed leather, minerals, fiber, and fabric, repeated duplication of a fine surface texture on the nanometer scale cannot be realized by the magnitude of the pressure of the press, and thus, desired colors and patterns must be realized through additional surface treatment.

However, such additional surface treatment is also problematic in that it is difficult to realize a good texture and structure, as in the skin of the insects, plants, processed leather, minerals, fiber, and fabric.

DISCLOSURE

Technical Problem

Accordingly, the present invention provides a method of duplicating the texture of the surface of an object, such as an animal, plant, mineral, fabric, or wood, on metal or plastic to thus realize the same texture, and specifically, a method of duplicating the nano-pattern of the surface of an object so that metal or plastic is imparted with the surface texture of the selected object using a nano-imprint plastic mold and an electroformed master mold.

In addition, the present invention provides a method of duplicating the nano-pattern of the surface of an object by scanning the surface of an object to be duplicated, performing two-dimensional (2D) or three-dimensional (3D) micro- or nano-technology, thus forming a standard pattern, connecting nano-imprint module master molds, and photolithography & etching the edge portion of the to impart the standard pattern, thus forming a large-area master mold having a desired size.

Technical Solution

According to the present invention, a method of electroforming the surface texture of an object using an imprint mold may comprise
  selecting the object having the nano-pattern texture to be duplicated;
  disposing the selected object and pretreating a surface of the object by washing, drying and then forming a nano-thin film thereto to block transfer of impurities so as to facilitate separation of a nano-imprint mold;
  nano-imprinting the surface of the object, thus duplicating it on a plastic mold;
  metallizing a surface of the plastic mold and performing first electroforming of the plastic mold, thus manufacturing metal module master molds;
  preparing a standard pattern by scanning the surface of the object to achieve an two-dimensional image and three-dimensional depth information and determine a part of a scanned image of the surface of the object as the standard pattern;
  connecting the metal module master molds to each other through welding thus producing a large-area metal module master mold;
  photolithography & etching the edge portion of the metal module master mold of the large-area metal module master mold to impart the standard pattern;
  performing second electroforming a large-area metal unit master mold thus producing a metal unit master mold; and
  performing third electroforming the metal unit master mold, thus producing a the duplicate having the nano-pattern texture of the object.

Advantageous Effects

According to the present invention, the nano-pattern texture of the surface of the selected object is nano-imprinted, thus manufacturing module master molds, which are then subjected to 2D or 3D edge processing and electroforming, thus manufacturing a large-area unit master mold, from which the same texture can then be duplicated on metal or plastic, thus realizing industrial availability.

In addition, according to the present invention, because electroforming is performed using the master mold having the nano-pattern texture of the surface of the selected object, the same texture can be duplicated on metal having a uniform thickness, thus realizing industrial availability.

In addition, according to the present invention, the surface of the selected object, having a beautiful and soft texture, structure and color, can be mass-duplicated and mass-produced, thus realizing convenient effects industrial use.

MODE FOR INVENTION

Hereinafter, a detailed description will be given of a method of duplicating the nano-pattern of the surface of an object using electroforming according to the present invention, with reference to the accompanying drawings.

In the description of the embodiment of the present invention, the drawings and explanation of techniques which are not directly concerned with the present invention or are well-known in the art are omitted, so that the major point of the present invention can be clearly and definitely communicated.

Figure 1:
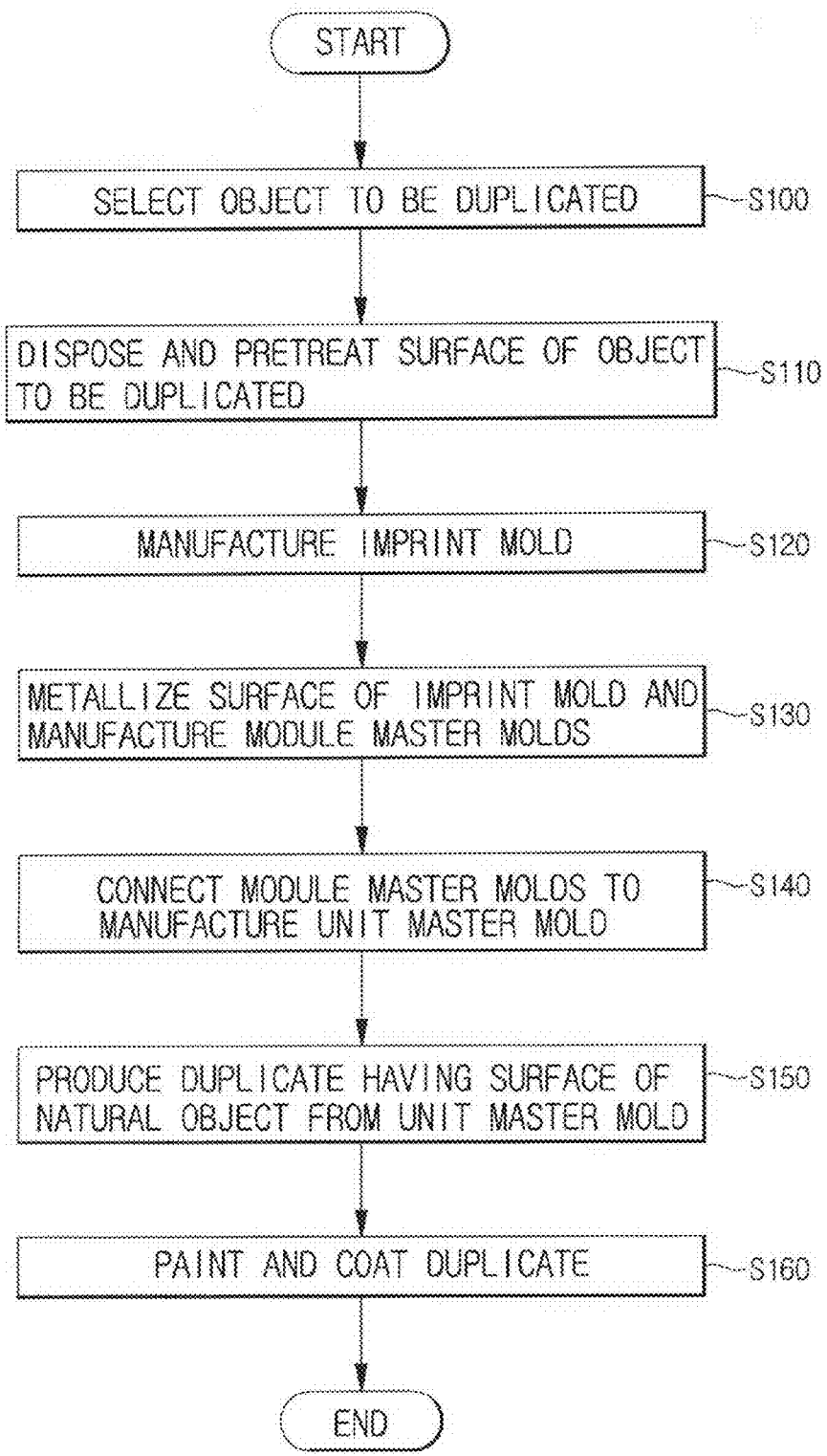
FIG. 1 is a flowchart sequentially illustrating the process of duplicating the nano-pattern texture of the surface of an object according to the present invention.

As illustrated in FIG. 1, the method of duplicating the nano-pattern texture of the surface of the object according to the embodiment of the present invention comprises selecting an object to be duplicated; disposing and washing the object; subjecting the object to nano-imprinting to thus duplicate it on a plastic mold; subjecting the plastic mold to vapor deposition and electroforming to thus manufacture metal module master molds; trimming the edges of the module master molds, connecting the module master molds, performing micro- or nano-processing on the edge potions to it apart a standard pattern, and performing electroforming, thus manufacturing large-area metal unit master mold; producing a duplicate having the nano-pattern surface texture from the unit master mold; and subjecting the duplicate having the nano-pattern surface texture to vapor deposition or printing and coating.

Preferably, the method of the present invention further comprises subjecting the object to be duplicated to pretreatment, such as washing and drying, and then to nano-separation film treatment for electroforming so that the transfer of impurities is blocked and the duplicate is easily separated.

The nano-imprinting for the duplication of the surface texture of the object performed using a thermoplastic polymer film, which is a kind of plastic.

The nano-imprinting includes PDMS molding, UV imprinting, hot embossing, and roll imprinting, and is performed through either a casting process or an injection process.

The nano-imprinting enables duplication on the mold through hot embossing with a thermoplastic polymer film.

The nano-imprinting includes a combination of UV imprinting and roll imprinting, or a combination of hot embossing and roll imprinting.

The metallization of the surface of the mold is performed using any one process selected from among vapor deposition, spraying, and wet silver curing.

The electroforming is performed through electroplating or electroless plating.

The unit master mold is formed to have an enlarged area by trimming the edges of the module master molds, arranging the module master molds, connecting them through adhesion or welding and subjecting the trimmed portions of the module master molds to photolithography & etching to part a predetermined standard pattern on the edge portions.

Below, the method of duplicating the nano-pattern texture of the surface of the object according to the embodiment of the present invention is specifically described in conjunction with the appended drawings.

The electroforming process (galvanoplastics) is a technique for duplicating the same surface texture as that of the pattern using electroplating, and performs electrodeposition coating of a thin film of metal ions through electroplating, thus forming a model having the same surface as the pattern. The pattern may be non-metallic or metallic. The non-metallic pattern is pretreated with a separation film or the like, after which the surface thereof is coated with graphite powder or copper powder or with a thin film made of gold or silver, in order to impart conductivity thereto. The surface of the metallic pattern is coated with a thin film made of oxide or graphite powder, that is, a separation film, after which the metallic pattern is placed in an electrolytic bath and is then electrodeposited with a metal component under the flow of current. The metal electrodeposited on the surface of the pattern is removed thereby obtaining a negative mold having a reversed form. Examples of the metal for electrodeposition include copper, nickel, iron, etc. The reversed form may be used as it is, or alternatively, the surface thereof may be repeatedly subjected to separation film treatment and electroforming, thereby duplicating the same product as the pattern.

Generally, plating and electroforming are distinguished from each other depending on the thickness of the plating layer. For example, the plating layer resulting from plating is 0.001~0.05 mm thick, and the plating layer resulting from electroforming is 0.025~25 mm thick.

The electroforming process is characterized in that various physical properties may be obtained through adjustment of the type and hardness of metal depending on the electrolysis conditions, there is little difference between the duplicate and the pattern, surface duplication is realized with high fidelity, almost no limitations are posed on the size and shape of the duplicate, high-purity metal products can be obtained, both one-off production and mass production are possible, and seamless tubes or hollow products can be manufactured. However, the electroforming process is disadvantageous because a long period of time is required therefor, unnecessary shapes or minor shapes, such as scratches, may also be duplicated, high technical knowledge for manufacture of the product and design of the pattern is needed, it is difficult to obtain a product having a uniform thickness in the presence of severe roughness and curvature, and high expense incurs.

Polydimethylsiloxane (PDMS) is a kind of polymer material suitable for a molding process which facilitates the mass production of fine duplicate products on a nanometer scale of 100 nm or less.

The PDMS, which is a kind of plastic, may be manufactured in the form of a negative mold by mixing a raw material thereof with a curing agent and sintering the mixture in a positive mold having a predetermined shape. When such a PDMS mold is used, a desired nano-pattern may be realized on the surface of another metal using the nano-pattern which is nano-imprinted on the mold, as in the relationship between a stamp and ink. This method is referred to as soft lithography. Instead of the above positive mold, a negative mold may be used.

The nano-imprinting process is a technique for duplicating the nano-pattern surface by placing a stamp having nano-sized surface roughness on a polymer resin-applied substrate and then pressing it thereon, and is classified into hot embossing using heat and UV imprinting to cure the polymer resin on the substrate using UV light. In addition, for mass production, roll imprinting using a roll-shaped stamp is an example thereof. For example, when a photosensitive material such as SU-8 is applied on a silicon wafer and is then patterned using a photomask, a master may be obtained. When PDMS is subjected to casting or injection using the master as a mold and then to sintering, the PDMS mold, functioning as a stamp, may be completed. Soft lithography using the PDMS stamp thus obtained includes micro contact printing, replica molding, micro transfer molding, micro molding using capillaries, etc.

PDMS is advantageous because it is non-toxic and transparent and has very low autofluorescence, and is particularly useful for biological experiments requiring frequent fluorescent measurements. Further, when the surface of the completed PDMS is plasma-treated, surface oxidation occurs to thus realize hydrophilic surface properties, and simultaneously, the above PDMS may be connected with glass or another PDMS material, and therefore it may be widely utilized for the manufacture of microfluidic channels.

The vapor deposition process is a technique for vaporizing an object to thus deposit it on the surface of another object, and includes chemical vapor deposition (CVD) and physical vapor deposition (PVD). CVD serves to form a film on the surface of an object using a chemical reaction. For instance, CVD may be applied as in the formation of a film through the control of a chemical reaction on a semiconductor wafer.

Examples of the CVD include low pressure CVD (LPCVD), plasma enhanced CVD (PECVD), and atmospheric pressure CVD (APCVD), and examples of the PVD include evaporation using metal vapor and sputtering, in which physical impacts applied to material. In addition, atomic layer deposition (ALD) is useful.

Although it is typically difficult to industrially copy beautiful and soft textures, structures and colors of the skins or surfaces of objects, such as leather, fabric, plants, trees, minerals, or insects, which are present naturally in the natural world or are present artificially through processing and industrial arts, the present invention is intended to repeatedly duplicate a nano-pattern texture similar to that of the surface of the pattern through 2D or 3D scanning, micro- or nano-processing, arrangement, connection, and electroforming.

Among the above objects, any object to be duplicated is selected, for example, leather is selected (S100), after which the surface of the selected object washed to remove impurities, and the object is selectively disposed in a planar or curved state, and is then subjected to nano-separation film surface treatment (S110). The separation film treatment performed to form a thin film on the surface of the washed object, so that an imprint mold is easily separated therefrom.

The surface of the object is subjected to nano-imprinting, such as PDMS molding or hot embossing, thus manufacturing a mold (S120).

The nano-imprinting includes one or more selected from among PDMS molding, hot embossing, UV (Ultra Violet) imprinting, and roll imprinting, and may be performed using either a casting process or an injection process.

For example, the nano-imprinting may be performed through any one selected from among PDMS molding, hot embossing with a thermoplastic polymer film, UV printing, roll printing a combination of UV imprinting and roll imprinting, and a combination of hot embossing and roll imprinting.

Nano-imprinting enables the manufacture of the mold for the duplication of a fine nano-pattern surface, and plays a role in imprinting a nano-structured pattern on the surface of the mold, like the concept of stamping paper. Nano-imprinting materials include thermoplastic, thermosetting, and UV-curable resist material, in addition to PDMS. Although nano-imprinting is similar to the basic principle of polymer molding, it is quite different from a conventional imprinting process because microphysical phenomena, including capillary tube action, electromagnetic power, and attractive force between molecules or atoms, which are negligible and less influential in the conventional technique, must be thoroughly considered when molding a nano-sized structure.

Thus, the nano-imprinting process according to the present invention requires the development of material in consideration of such microphysical phenomena, and requires techniques for managing fine dust having a size from tens of nanometers to hundreds of micrometers, easily occurring under general working conditions, because the mold is manufactured on a nanometer scale. Further, there is an essential need for a vibration insulation system to minimize external vibrations during the work. In this way, the nano-imprinting process according to the present invention is very different from the conventional technique.

The nano-imprint old, having high precision, is separated, metallized through vapor deposition, and then electroformed, thus obtaining a plurality of small module master molds.

In the present invention, vapor deposition is mainly performed using CVD, but may be carried out through PECVD, APCVD, or PVD. Before vapor deposition, nano-separation file may be performed, as necessary. The metallized mold resulting from vapor deposition is subjected to electroforming, thus obtaining a plurality of small module master molds (S130).

For the metallization of the mold, spraying and wet silver curing are also examples thereof, in addition to vapor deposition, and any one selected on among them may be applied.

The nano-pattern of the surface of the object to be duplicated is subjected to 2D or 3D scanning, thus designing a predetermined standard pattern and preparing for processing. Such processing may be performed through photolithography & etching.

The edge portions of the module master molds thus manufactured are uniformly trimmed, the module master molds thus trimmed are arranged, precisely and connected through adhesion or welding, after then edge portions thereof are subjected to 2D or 3D micro- or nano-processing to impart the designed standard pattern, and then the module master molds connected is electroformed, thereby manufacturing a metal unit master mold (S140).

The master mold thus manufactured is in a positive form. In the case where a negative master mold is required, it may be ensured by repeating the electroforming. The 2D or 3D processing is micro- or nano-technology for naturally connecting the edge portions of respective module master molds having the duplicated nano-imprinted pattern.

The electroforming process is a technique for coating the surface of metal with another metal using the principle of electrolysis, and is also referred to as an electroplating process. That is, a plating metal is disposed at the negative electrode, and an electrodepositing metal is disposed at the positive electrode, after which the plating metal is placed in the electrolytic solution containing metal ions to be electrodeposited, and is then electrolyzed under the flow of current, thereby electrodepositing the metal ions on the metal surface.

As a technique corresponding thereto, electroless plating, chemical plating, and self-catalytic plating are exemplary. In the electroless plating, a reducing agent such as formaldehyde or hydrazine supplies electrons for reducing metal ions into metal molecules in an aqueous solution. This reaction occurs on the surface of the catalyst, and the plating agent includes copper, nickel-phosphorus alloys, and nickel-boron alloys. The reducing agent brings about the reduction of another material as it itself is oxidized, and examples thereof include hydrogen, carbon, metal sodium, and sulfite. The electroless plating makes the plating layer denser and the thickness thereof more uniform, compared to electroplating, and also, may be advantageously applied to various patterns including plastic or organic substances, and may thus be used as an alternative in the present invention.

Next, using the unit master mold, metal electroforming or plastic extrusion or injection is performed, thus producing a duplicate having the nano-pattern texture of the surface or skin of the selected object (S150). The produced duplicate is further subjected to vapor deposition or painting for coloring treatment and coating for physical or chemical protection, and is thereby completed (S160).

According to the embodiment of the present invention, in the production of the duplicate having the same nano-pattern texture as the surface of the object, when an extrusion process is performed through casting, the unit master mold having the nano-pattern surface roughness is pressed on plastic, thus producing the duplicate having the nano-pattern texture, after which the mold is separated. The production method according to the present invention is characterized in that it requires techniques for precise arrangement, vibration insulation to minimize external vibration, equilibrium between the nano mold and the plastic and deforming, plating, having micro- or nano-precision, and the application of uniform pressure over a large area, and is thus evidently different from the conventional technique. The nano-pattern texture of the surface of the selected object may also be duplicated on metal through electroforming.

Figure 2:
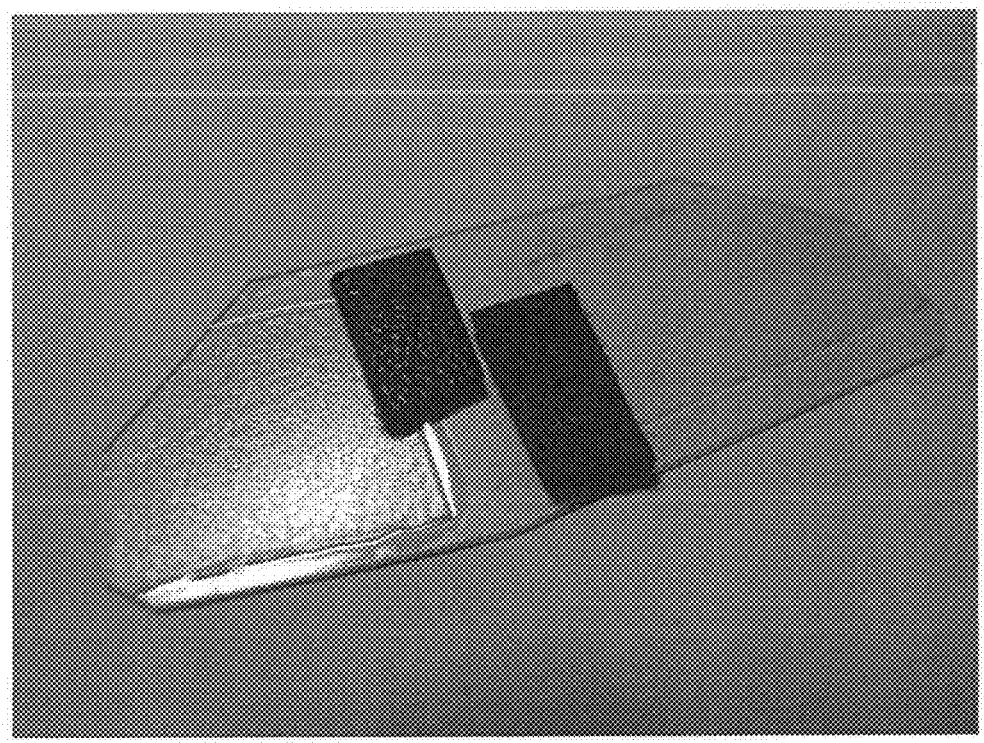
FIG. 2 is a photograph illustrating a large-area master mold, which is manufactured by subjecting a plurality of module master molds, which are imprinted with the surface of natural leather according to an embodiment of the present invention, to edge processing.

Referring to FIG. 2, there is illustrated a large-area mold completed by subjecting the plurality of small nodule master molds, in which the front and back surfaces of natural leather, selected according to the embodiment of the present invention, are nano-imprinted, to 2D or 3D processing connecting the module master molds and precise edge processing to impart the standard pattern.

That is, the front and back surfaces of natural leather, having a small size, are imprinted through hot embossing using a thermoplastic polymer film, and are then subjected to 2D or 3D edge processing to impart the standard pattern set through surface scanning, thereby completing the mold.

Figure 3:
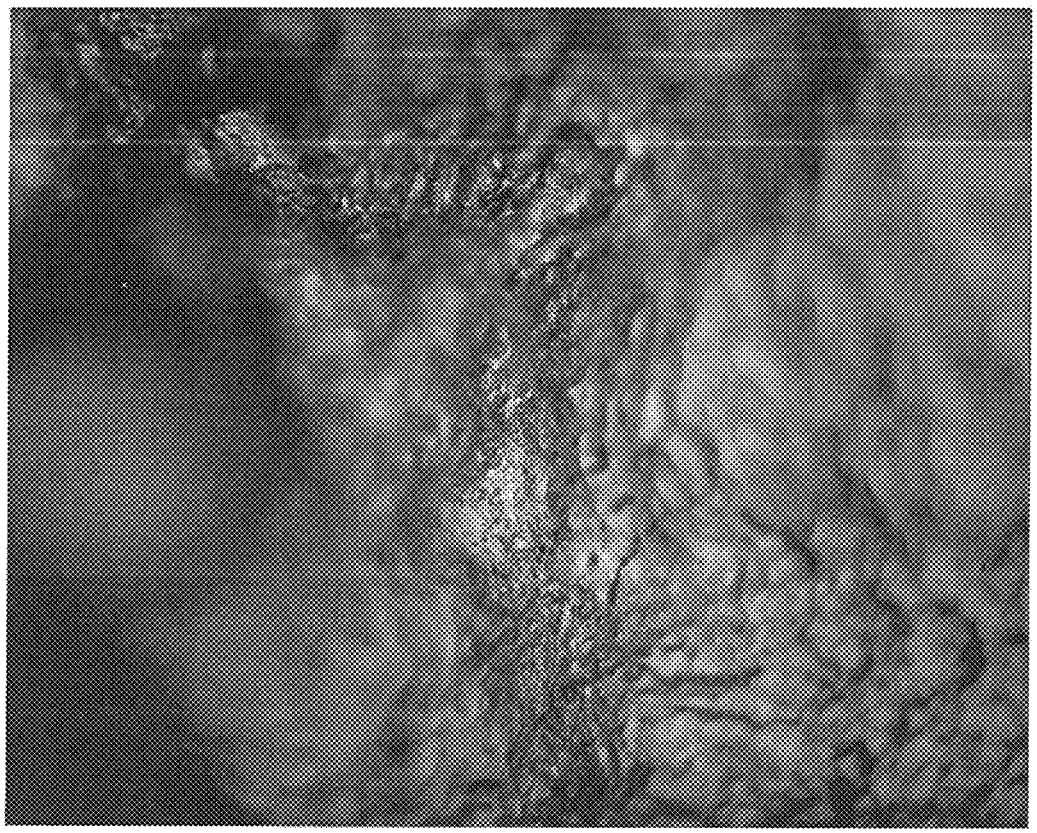
FIG. 3 is a photograph, magnified 2×, of the front surface of natural leather, which is to be molded through nano-imprinting, according to the embodiment of the present invention.
Figure 4:
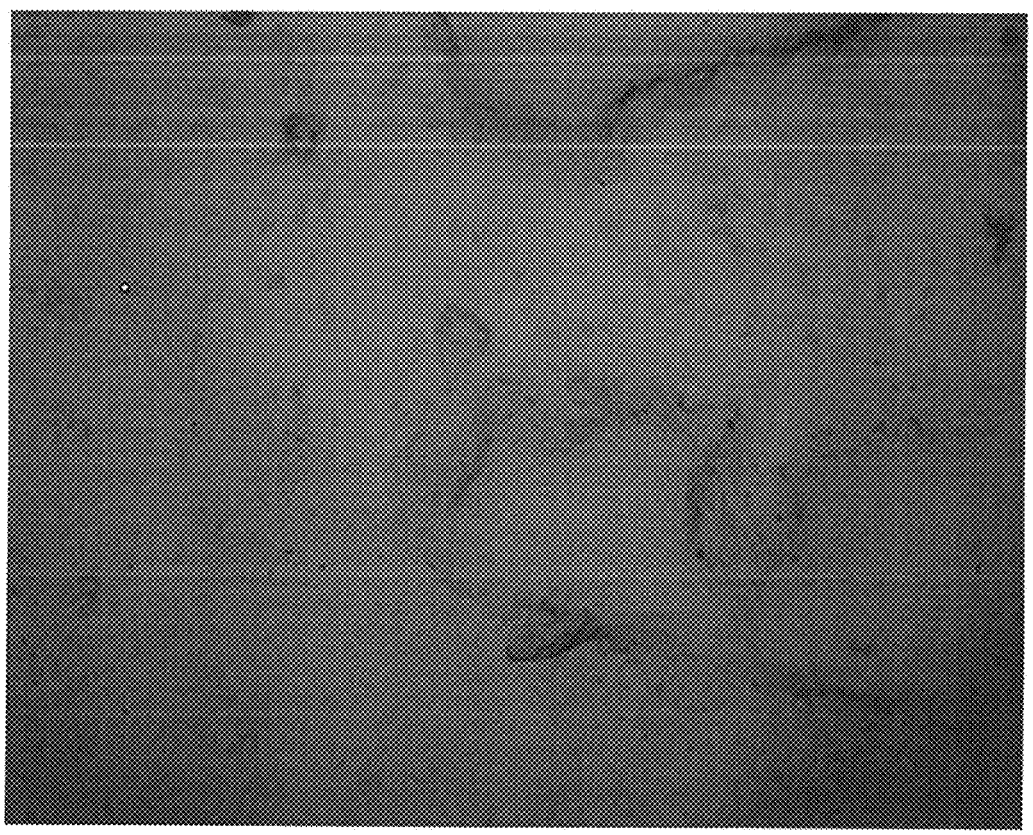
FIG. 4 is a photograph, magnified 2×, of the mold which is nano-imprinted with the front surface of natural leather according to the embodiment of the present invention.
Figure 5:
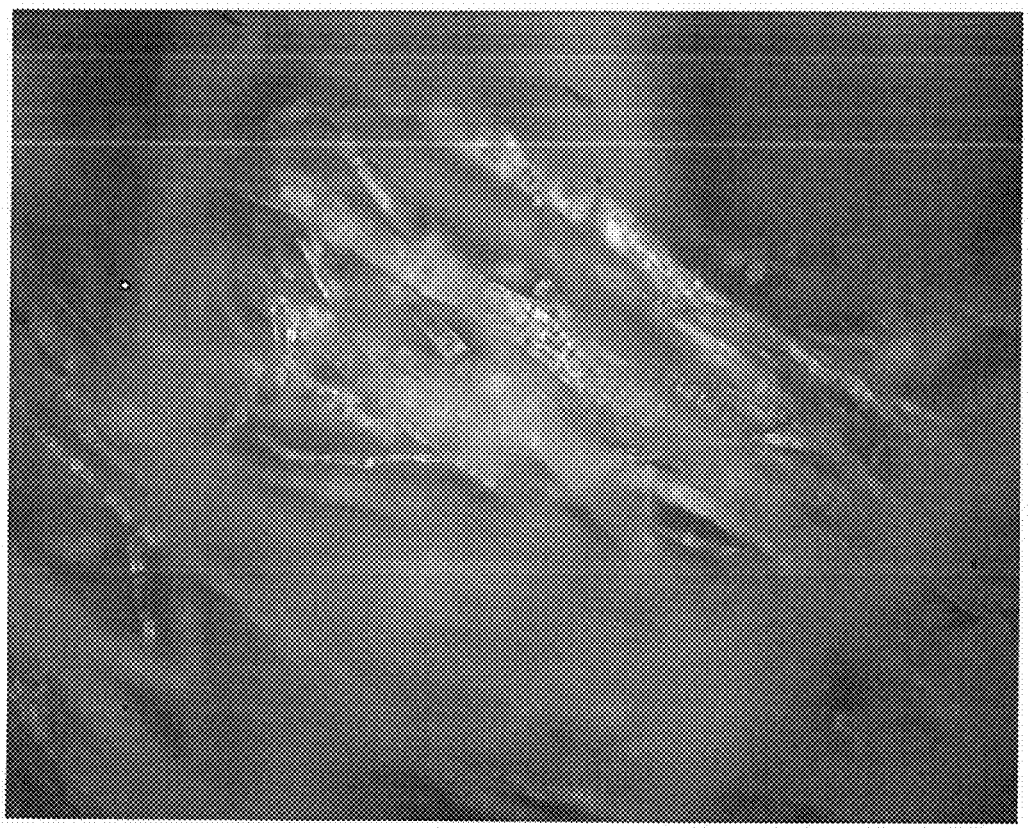
FIG. 5 is a photograph, magnified 2×, of the back surface of natural leather, which is be molded through nano-imprinting, according to the embodiment of the present invention.
Figure 6:
FIG. 6 is a photograph, magnified 2×, of the mold which is nano-imprinted with the back surface of natural leather according to the embodiment of the present invention.
Figure 7:
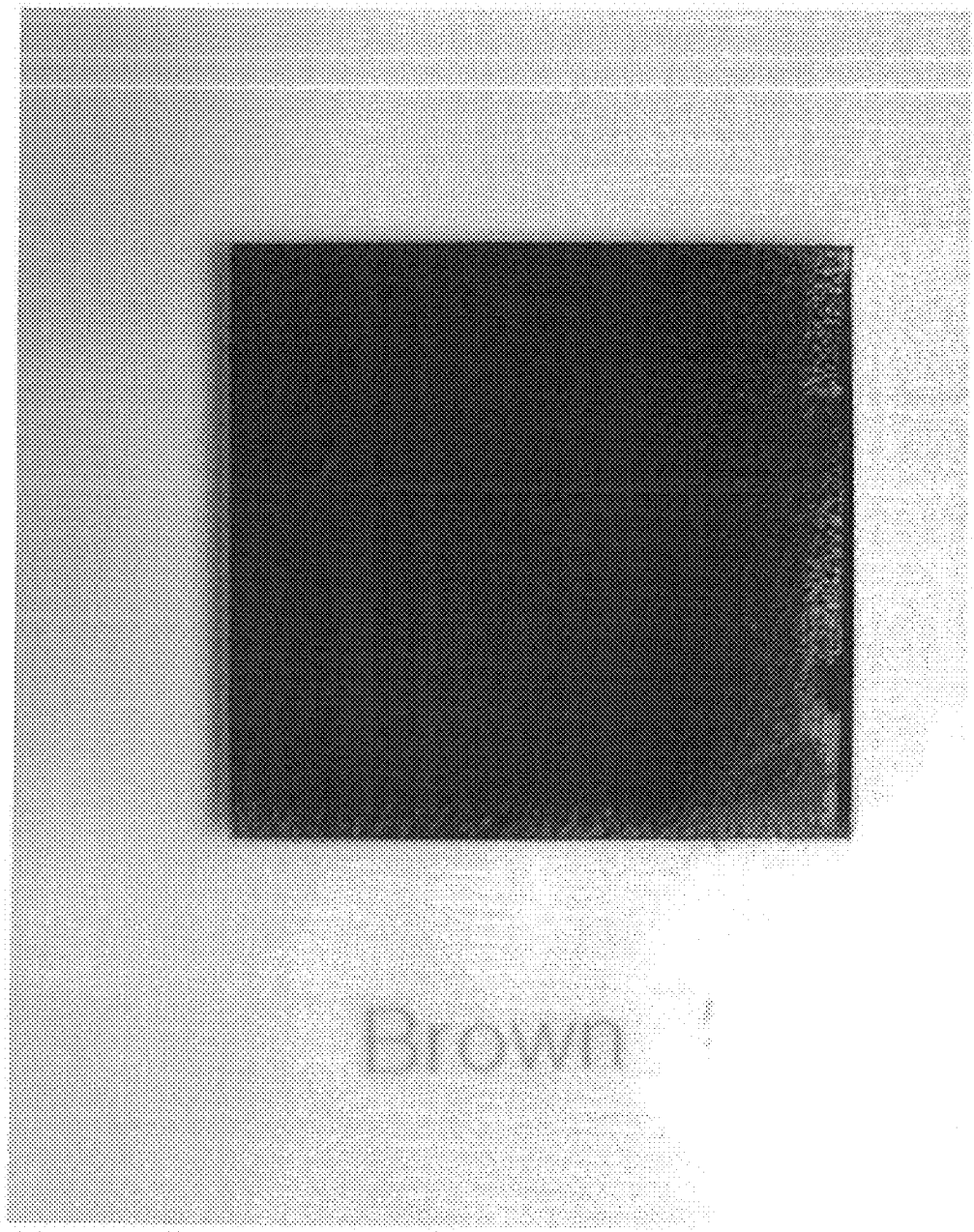
FIG. 7 is a photograph illustrating a final product having the nano-pattern texture of the surface of the object, according to the embodiment of the present invention, duplicated therein.

FIG. 3 is a photograph, magnified 2× of the front surface of natural leather selected for nano-imprinting of the surface texture according to the embodiment of the present invention, FIG. 4 is a photograph, magnified 2×, of the mold imprinted with the natural leather of FIG. 3, FIG. 5 is a photograph, magnified 2×, of the back surface of natural leather selected for imprinting according to the embodiment of the present invention, FIG. 6 is a photograph, magnified of the mold imprinted with the natural leather of FIG. 5, and FIG. 7 is a photograph of the state of a final product having the nano-pattern texture of the surface of the object selected according to the embodiment of the present invention, duplicated thereon.

Figure 8:
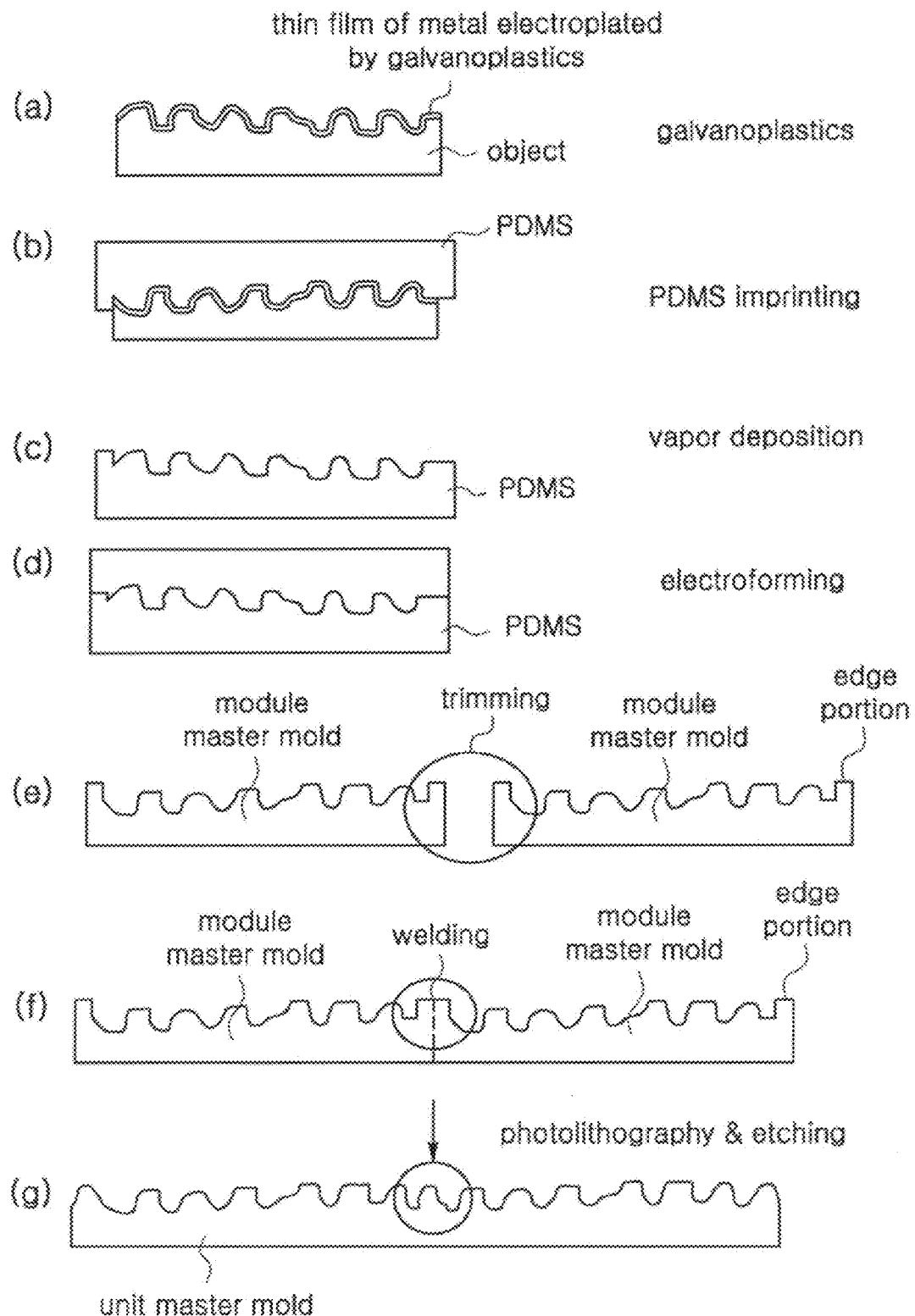
FIGS. 8 and 9 illustrate the process of manufacturing large-area unit master mold according to an embodiment of the present invention.
Figure 9:
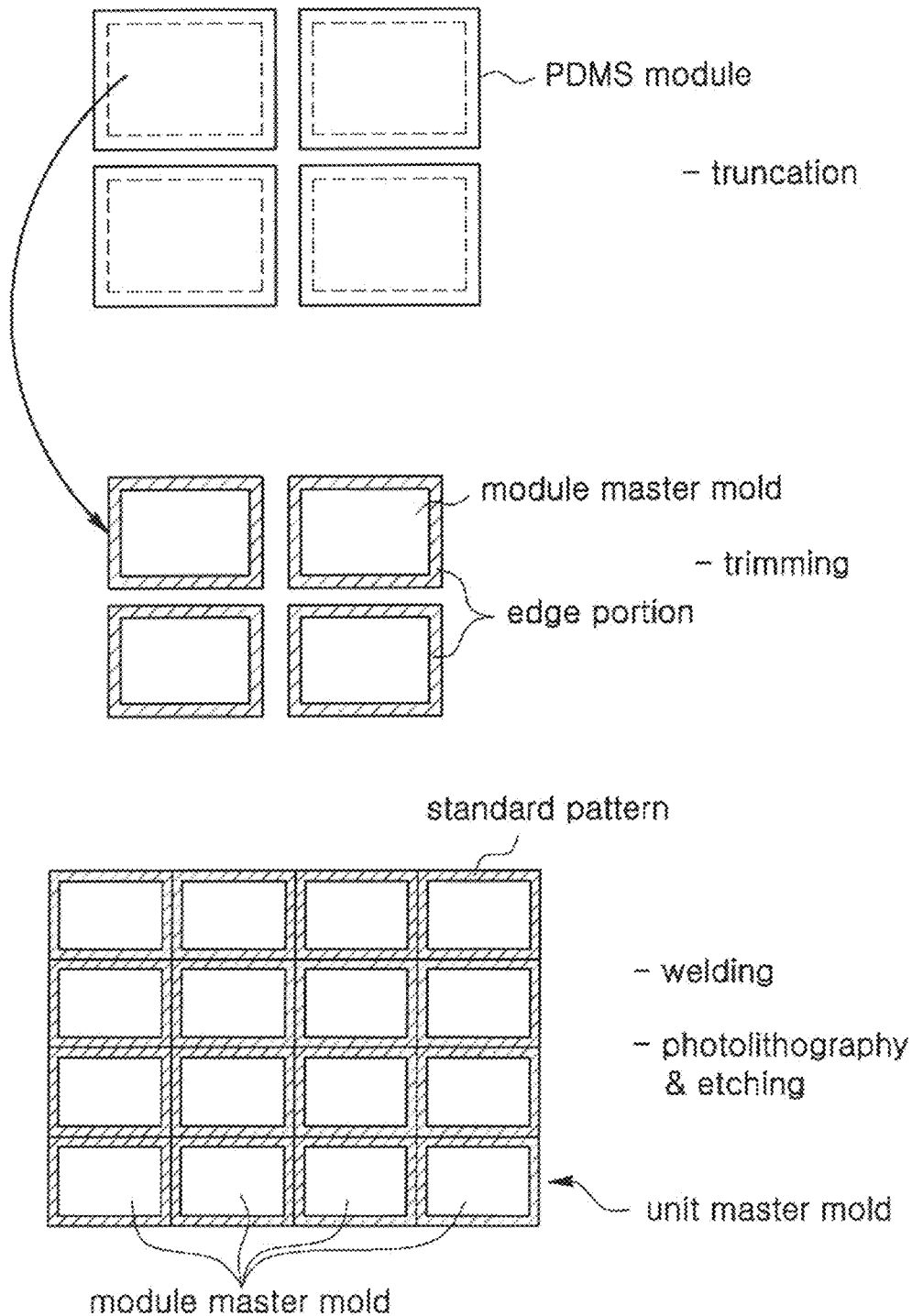

Further, FIGS. 8 and 9 illustrate the process of manufacturing a large-area unit master mold according to an embodiment of the present invention. Specifically, in FIG. 8, (a) shows galvanoplastics in which a surface of an object is coated with graphite powder or the like and is then electroplated with metal, such as copper; (b) shows nano-imprinting in which the electroplated metal is molded with polydimethylsiloxane (PDNS); (c) shows metalization in which vapor deposition is performed on the molded PDMS; (d) shows electroforming in which the metalized mold resulting from vapor deposition is subjected to electroforming, thus obtaining a plurality of small module master molds; (e) shows that the module master mold is subjected to trimming; (f) shows large-area unit master mold which is obtained by combining the plurality of module master molds; and (g) shows an edge portion where two module master molds are combined is etched to have a pattern and depth similar to the standard pattern.

Referring FIG. 9 (e), there is an edge portion. This edge portion is the portion which surrounds the electroformed portion in the module master mold.

After electroforming, the edge portion is trimmed. In trimming process, the side and face of the edge portion is cleaned and made even.

Using the unit master mold, metal electroforming or plastic extrusion or injection is performed, thus producing a duplicate having the nano-pattern texture of the surface or skin of the selected object.

An object of the present invention is duplicating the texture of the surface of an object such as natural products. Here, it should be carefully noted that the surface of the object, particularly, the surface of a natural product, is composed of irregular patterns rather than regular patterns, taken as a whole, and that by using a natural product piece, or piece having a small area, a duplicate having an area larger than the area of the piece or the pieces is obtained.

That is, since the respective natural product pieces (corresponding to a small-scale module) have no irregular patterns, gradation, matching and the like should be considered upon combination of the pieces.

Figure 10:
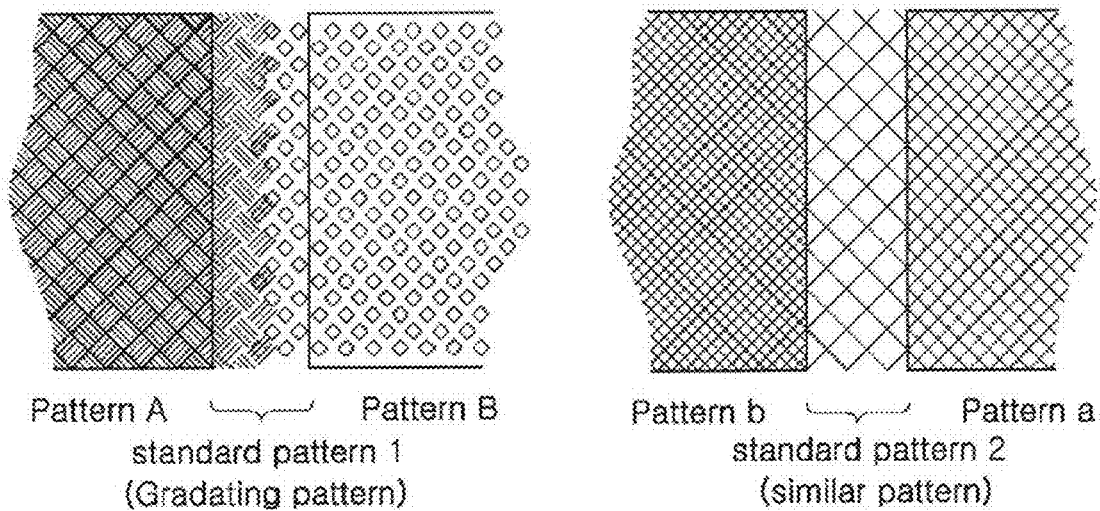
FIG. 10 shows examples of standard patterns.

FIG. 10 shows examples of standard patterns.

FIG. 10 shows one example of standard patterns (standard pattern fixed in consideration of the gradation when there is a difference in the size of the patterns, and other examples of standard patterns (standard pattern 2) designed in consideration of the snatching when there two patterns are roughly similar to each other. Here, Pattern A, pattern B, pattern a and pattern b shows patterns of small scale modules)

In light of the fact that in the present invention, the standard patterns for the small-scale modules (corresponding to the metal module master molds of the embodiment of the present invention), which are adjacent to each other, are not equal to each other, the edge portion of the small-scale modules are processed to part the standard pattern selected so as to improve gradation, matching and the like between the edges, thereby enabling the natural texture to be obtained from the duplicate having the larger area.

Figure 11:
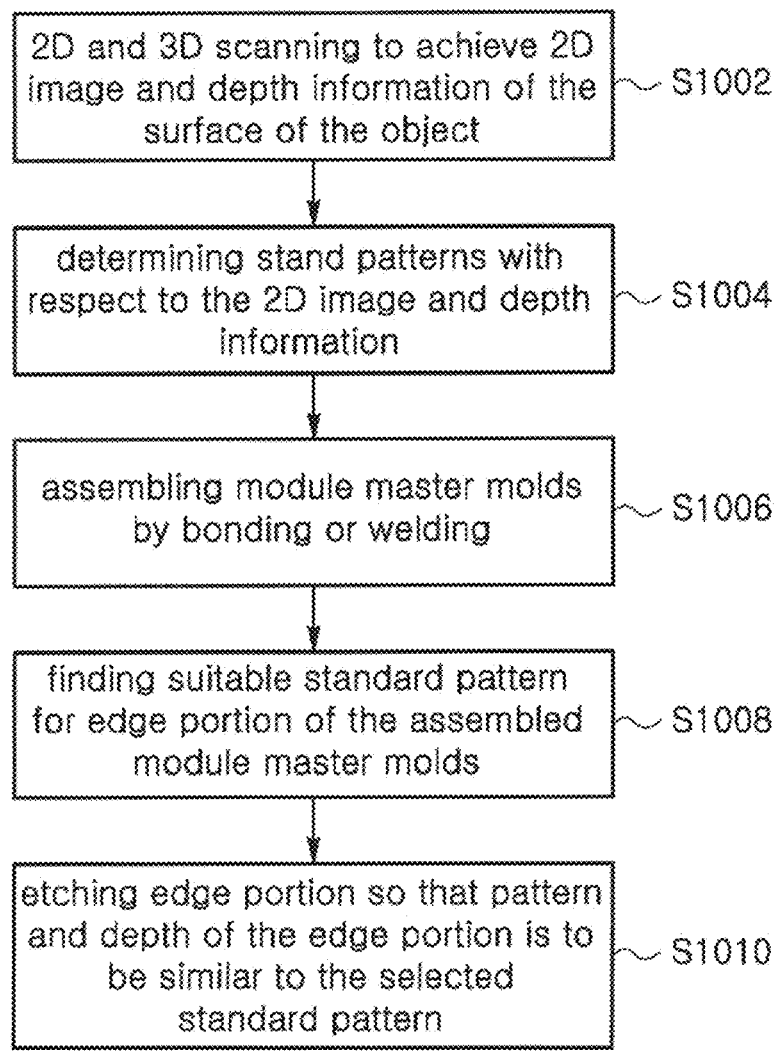
FIG. 11 shows how to process the edge portion of the unit master mold.

FIG. 11 shows how to process the edge portion of the unit master mold.

2D and 3D scanning is performed to achieve 2D image and depth information of the surface of the object (S1002)

Since the present invention relates to duplicating an object, it is effective that the standard pattern is also obtained from the object. To do so, after 2D information, namely, a two-dimensional pattern image, and 3D information, namely, depth information, have been obtained by scanning a surface of the object, a standard pattern is selected with reference to the obtained information.

In considering the 2D image and depth information, a plurality of standard patterns are determined. (S1004) For example, a pattern, which has the size corresponding to an edge portion and the most popular distribution is selected as a standard pattern.

Combining of module master molds is performed by bonding or welding (S1006)

It is preferable that the edge portion of the module master mold is trimmed before the combining process.

Finding suitable standard pattern for edge portion of the assembled module master molds is performed. (S1008)

Photolithography & etching is performed so that pattern and depth of the edge portion is to be similar to the selected standard pattern. When Photolithography & etching is performed the photo mask, which is made in considering the standard pattern, is used.

Figure 12:
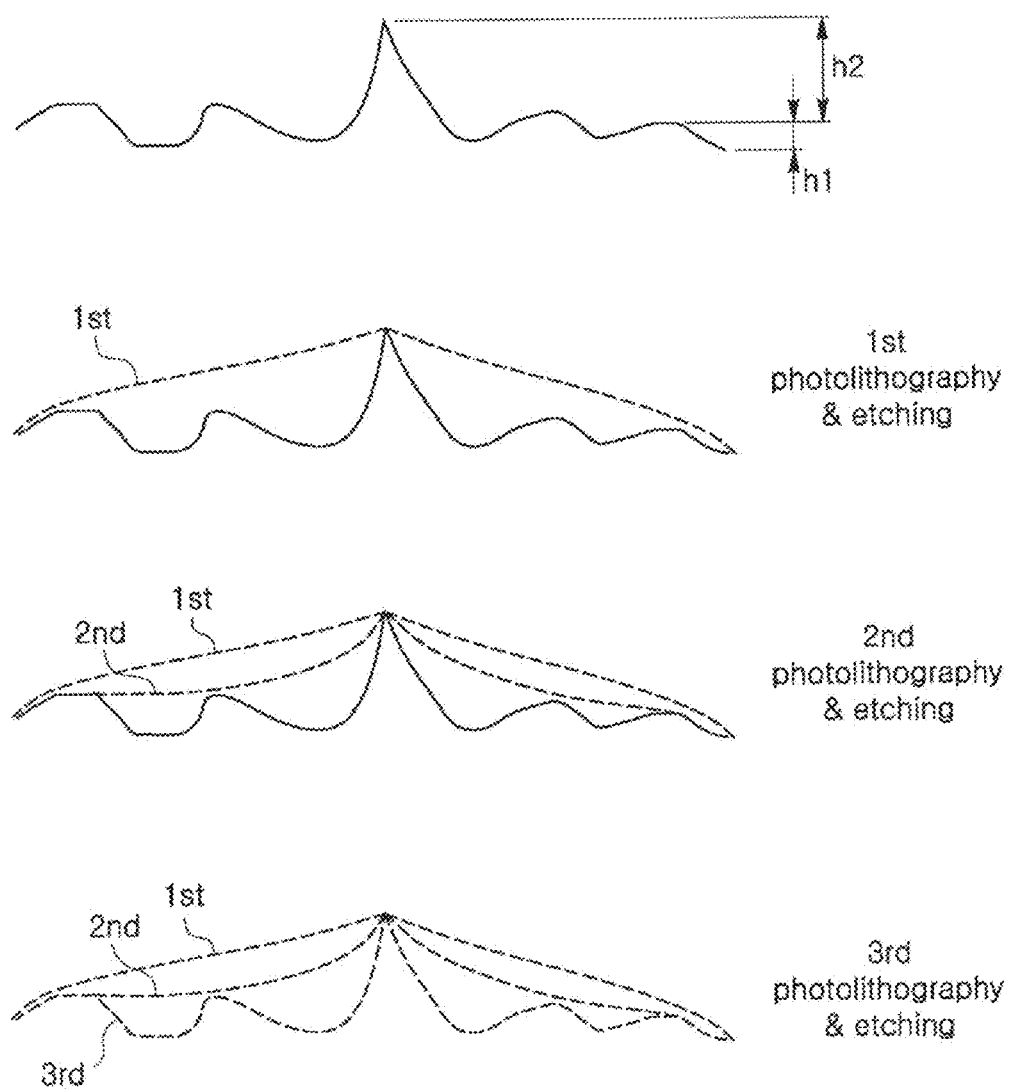
FIG. 12 how multi-step photolithography & etching process.

FIG. 12 shows multi-step photolithography & etching process. When difference in height is to 9 large (h2>>h1) in standard pattern it is impossible to achieve a pattern corresponding to the standard pattern in one process.

In this case, multi-step photolithography & etching process can be performed as shown in FIG. 12.

Figure 13:
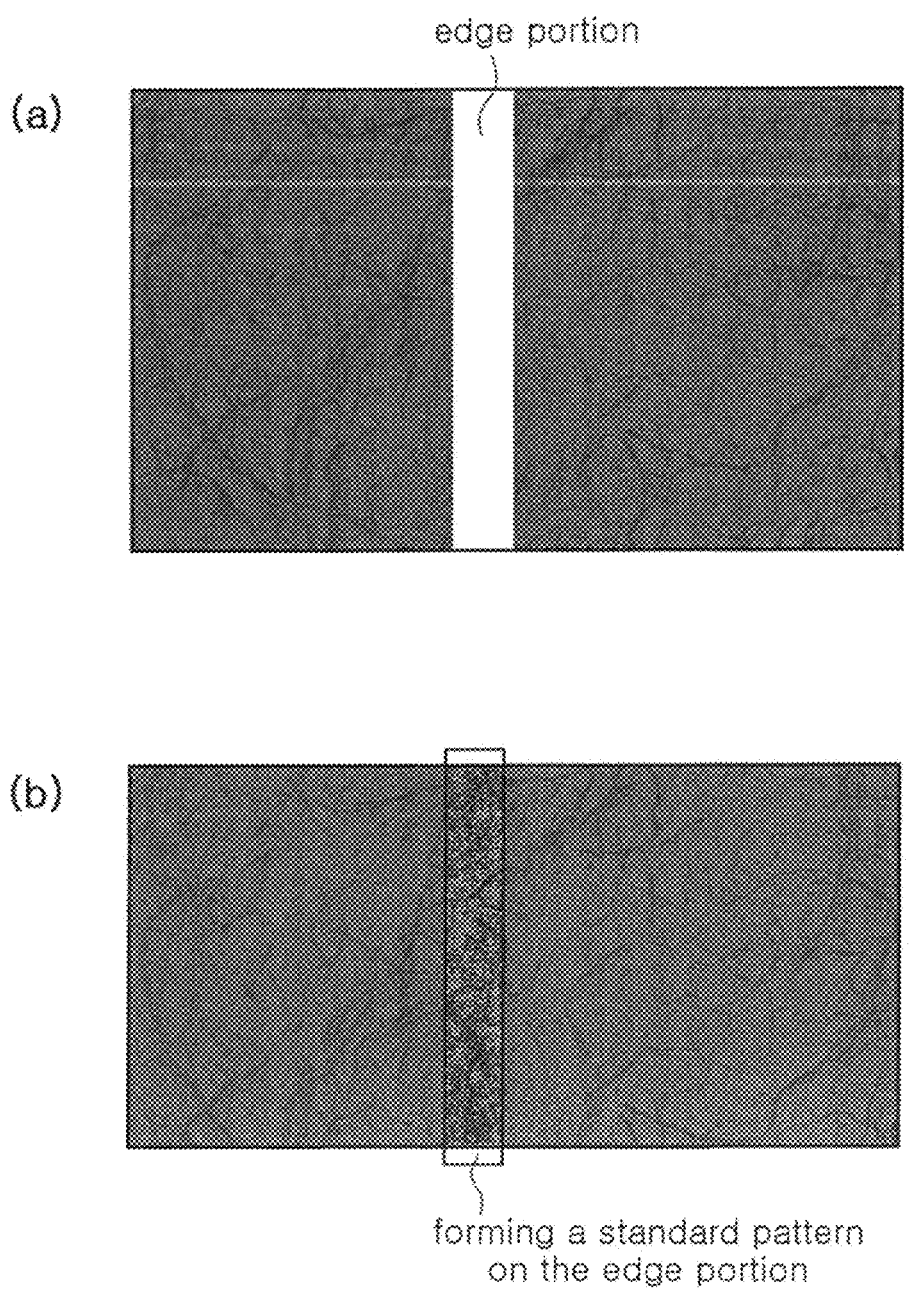
FIG. 13 shows module master mold where a standard pattern is formed on edge portion.

FIG. 13 shows module master cold where a standard pattern is formed on edge portion.

Referring to FIG. 13, it is understandable that the module master mold where a standard pattern formed on the edge portion looks much better than the module master mold where a standard pattern is not formed.

The nano-pattern texture of the surface of the selected object according to the present invention may be duplicated on either metal or plastic. Hence, the technique of the present invention as above is advantageous because the nano-pattern texture of the skin or surface of the selected object is nano-imprinted, thus manufacturing the mold, which is then repeatedly electroformed, thus duplicating it on metal or plastic.

The preferred embodiment of the present invention is set forth for illustration, but is not to be construed to limit the present invention, and may be variously modified within a range that does not deviate from the technical spirit of the present invention. Accordingly, the exemplary embodiments disclosed in the present invention do not limit the technical spirit of the present invention but are intended to explain it and the technical spirit of the present invention is not limited thereby. The scope of the present invention should be defined by the accompanying claims, and all technical variations that fall within the range equivalent thereto should be regarded as being included in the scope of the present invention.

The invention claimed is:

1. A method for producing a duplicate of a nano-pattern texture of a surface of an object through electroforming using an imprint mold, comprising:
   selecting the object having the nano-pattern texture to be duplicated;
   disposing the selected object and pretreating a surface of the object by washing, drying and then forming a nano-thin film thereto to block transfer of impurities so as to facilitate separation of a nano-imprint mold;
   nano-imprinting the surface of the object having the nano-thin film, thus duplicating the surface of the object on a plastic mold;
   metallizing a surface of the plastic mold through a technique selected from the group consisting of vapor deposition, spraying, and wet silver mirror reaction, and performing a first electroforming of the surface of the plastic mold, and repeating to thus manufacture a plurality of metal module master molds;
   preparing a standard pattern by scanning the surface of the object to achieve a two-dimensional image and three-dimensional depth information and selecting a part of the scanned image of the surface of the object as the standard pattern;
   connecting the plurality of metal module master molds to each other through welding thus producing a large-area metal module master mold;
   treating the welded edge portions of the plurality of metal module master molds of the large-area metal module master mold by photolithography and etching to impart the standard pattern to the large-area metal module master mold;
   performing a second electroforming a on the large-area metal module master mold thus producing a metal unit master mold; and
   performing a third electroforming on the metal unit master mold, thus producing the duplicate having the nano-pattern texture of the object.

2. The method according to claim 1, further comprising subjecting the duplicate having the surface texture to either vapor deposition or painting for coloring treatment and coating with a protective film.

3. The method according to claim 1, wherein the object is selected from the group consisting of animals, plants, insects, minerals, woven fabric, and artwork.

4. The method according to claim 1, wherein the nano-imprinting comprises PDMS molding, to realize duplication on the mold.

5. The method according to claim 1, wherein the nano-imprinting comprises hot embossing with thermoplastic polymer film, to realize duplication on the mold.

6. The method according to claim 1, wherein the nano-imprinting comprises either UV imprinting or roll imprinting.

7. The method according to claim 1, wherein the nano-imprinting comprises a combination of UV imprinting and roll imprinting.

8. The method according to claim 1, wherein the nano-imprinting comprises a combination of hot embossing and roll imprinting.

9. The method according to claim 1, wherein the electroforming is performed through either electroplating or electroless plating.

10. The method according to claim 2, wherein the nano imprinting comprises a combination of UV imprinting and roll imprinting.

11. The method according to claim 2, wherein the nano-imprinting comprises a combination of hot embossing and roll imprinting.

* * * * *